US012664072B1

(12) United States Patent 
Yariv et al.

(10) Patent No.: US 12,664,072 B1 
(45) Date of Patent: Jun. 23, 2026

(54) TECHNIQUES FOR CODE DETECTION OF API PATHS

(71) Applicant: Wiz, Inc., New York, NY (US)

(72) Inventors: Ido Yariv, Lexington, MA (US); Cfir Cohen, Seattle, WA (US); Amit Rapaport, Redmond, WA (US); Or Tzabary, Petah Tikva (IL); Gilad Hoze, Tel Aviv (IL); Bar Vaserman, Ramat-Gan (IL); Assaf Segal, Tel Aviv (IL)

(73) Assignee: Wiz, Inc., New York, NY (US)

( * ) Notice: Subject to any disclaimer, the term of this patent is extended or adjusted under 35 U.S.C. 154(b) by 0 days.

(21) Appl. No.: 19/222,582

(22) Filed: May 29, 2025

(51) Int. Cl.
*G06F 11/36* (2025.01)
*G06F 11/3668* (2025.01)

(52) U.S. Cl.
CPC ................................. *G06F 11/3672* (2013.01)

(58) Field of Classification Search
CPC ....................................................... G06F 11/36
See application file for complete search history.

(56) References Cited

U.S. PATENT DOCUMENTS

| | | | |
|---|---|---|---|
| 10,104,007 B1 * | 10/2018 | Van Rensburg | .... H04L 67/1097 |
| 10,200,389 B2 | 2/2019 | Rostamabadi et al. | |
| 11,301,357 B1 * | 4/2022 | Gacek | ................... G06F 11/323 |
| 11,683,333 B1 | 6/2023 | Dominessy et al. | |
| 2021/0099483 A1 | 4/2021 | Shukla | |
| 2021/0352136 A1 * | 11/2021 | Dojka | .................... H04L 67/34 |
| 2023/0009127 A1 | 1/2023 | Boyer | |

\* cited by examiner

*Primary Examiner* — Jae U Jeon 
(74) *Attorney, Agent, or Firm* — M&B IP Analysts, LLC

(57) ABSTRACT

A method and system for generating an Application Programming Interface (API) path utilizing code detection is presented. The method includes detecting a resource, wherein the resource is deployed in a cloud computing environment; detecting at least a code object of a plurality of code objects stored in a code repository, from which the resource is deployed; inspecting only the at least a code object from which the resource is deployed for a hint of an API path; generating a potential API path based on the hint of the API path; executing a network access instruction in the cloud computing environment based on the generated API path; and determining that the potential API path is a validated API path based on a response of executing the network access instruction.

20 Claims, 4 Drawing Sheets

TECHNIQUES FOR CODE DETECTION OF API PATHS

TECHNICAL FIELD

The present disclosure relates generally to the field of cybersecurity threat detection and specifically to the detection of Application Programming Interface (API) paths which may indicate a potential cybersecurity threat, vulnerability, or data breach.

BACKGROUND

An API is a mechanism that enables two software components to communicate with each other using a set of definitions and protocols. There are multiple types of APIs such as a Simple Object Access Protocol (SOAP) API, a Remote Procedure Call (RPC) API, a WebSocket API, and a Representational State Transfer (REST) API.

API endpoints are final touchpoints in the API communication system. These include server Uniform Resource Locators (URLs), services, and other digital locations from where the information is sent and received between systems. API endpoints are specific URLs where a client can access an API. API endpoints serve as an authorized entryway that enables applications to interact with services, retrieve data, and perform various functions.

Since these API endpoints expose sensitive information and allow access to critical systems, they are prone to cybersecurity attacks. Thus, API endpoint security is essential to protect sensitive data, prevent data leaks, prevent unauthorized network access, prevent data manipulation, and misuse. Further, the detection of API paths is essential for cybersecurity threat detection, as they are common targets for such cybersecurity attacks. Thus, monitoring and analyzing API path activity is key in identifying such security threats, such as unauthorized access, data breaches, and the like.

Challenges in the field of endpoint security include the lack of visibility in detecting endpoints. Reasons for the lack of visibility in detecting endpoints are that endpoints are not static and change dynamically. Furthermore, the use of API gateways and proxies obstruct endpoint detection by acting as the front interface for network traffic. Further, API gateways route the network traffic to different backend services, hiding the actual API endpoints from external view.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In one general aspect, the method may include detecting a resource, where the resource is deployed in a cloud computing environment. The method may also include detecting at least a code object of a plurality of code objects stored in a code repository, from which the resource is deployed. The method may furthermore include inspecting only the at least a code object from which the resource is deployed for a hint of an API path. The method may in addition include generating a potential API path based on the hint of the API path; executing a network access instruction in the cloud computing environment based on the generated API path; and determining that the potential API path is a validated API path based on a response of executing the network access instruction. Other embodiments of this aspect include corresponding computer systems, apparatus, and computer programs recorded on one or more computer storage devices, each configured to perform the actions of the methods.

Implementations may include one or more of the following features. The method may include: scanning the cloud computing environment to detect the resource. The method where detecting a resource further may include: querying an API of the cloud computing environment for identifiers of deployed resources. The method may include: accessing the code repository utilizing a received credential. The method may include: inspecting the code repository for code objects. The method where detecting at least a code object from which the resource is deployed further may include: filtering the plurality of code objects in the code repository. The method may include: parsing each of the plurality of code objects to detect code objects that are utilized in an Infrastructure as Code (IaC) to deploy the resource in the cloud computing environment. The method may include: detecting the hint of the API path based on conducing static analysis on the at least a code object from which the resource is deployed. The method where generating an API path that corresponds to the hint of the API path further may include: querying a security database based on the hint of the API path for a corresponding API path. Implementations of the described techniques may include hardware, a method or process, or a computer tangible medium.

In one general aspect, a non-transitory computer-readable medium may include one or more instructions that, when executed by one or more processing circuitries of a device, cause the device to: detect a resource, where the resource is deployed in a cloud computing environment; detect at least a code object of a plurality of code objects stored in a code repository, from which the resource is deployed; inspect only the at least a code object from which the resource is deployed for a hint of an API path; generate a potential API path based on the hint of the API path execute a network access instruction in the cloud computing environment based on the generated API path; and determine that the potential API path is a validated API path based on a response of executing the network access instruction. Other embodiments of this aspect include corresponding computer systems, apparatus, and computer programs recorded on one or more computer storage devices, each configured to perform the actions of the methods.

In one general aspect, a system may include a processing circuitry. The system may also include a memory, the memory containing instructions that, when executed by the processing circuitry, configure the system to: detect a resource, where the resource is deployed in a cloud computing environment. The system may in addition detect at least a code object of a plurality of code objects stored in a code repository, from which the resource is deployed. The system may moreover inspect only the at least a code object from which the resource is deployed for a hint of an API path. The system may also generate a potential API path based on the hint of the API path. The system may furthermore execute a network access instruction in the cloud computing environment based on the generated API path. The system may in addition determine that the potential API path is a validated API path based on a response of executing the network access instruction. Other embodiments of this aspect include corresponding computer systems, apparatus, and computer programs recorded on one or more computer storage devices, each configured to perform the actions of the methods.

Implementations may include one or more of the following features. The system where the memory contains further instructions which when executed by the processing circuitry further configure the system to: scan the cloud computing environment to detect the resource. The system where the memory contains further instructions that, when executed by the processing circuitry for detecting a resource, further configure the system to: query an API of the cloud computing environment for identifiers of deployed resources. The system where the memory contains further instructions which when executed by the processing circuitry further configure the system to: access the code repository utilizing a received credential. The system where the memory contains further instructions which when executed by the processing circuitry further configure the system to: inspect the code repository for code objects. The system where the memory contains further instructions that, when executed by the processing circuitry for detecting at least a code object from which the resource is deployed, further configure the system to: filter the plurality of code objects in the code repository. The system where the memory contains further instructions which when executed by the processing circuitry further configure the system to: parse each of the plurality of code objects to detect code objects that are utilized in an Infrastructure as Code (IaC) to deploy the resource in the cloud computing environment. The system where the memory contains further instructions which when executed by the processing circuitry further configure the system to: detect the hint of the API path based on conducing static analysis on the at least a code object from which the resource is deployed. The system where the memory contains further instructions that, when executed by the processing circuitry for generating an API path that corresponds to the hint of the API path, further configure the system to: query a security database based on the hint of the API path for a corresponding API path. Implementations of the described techniques may include hardware, a method or process, or a computer-tangible medium.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
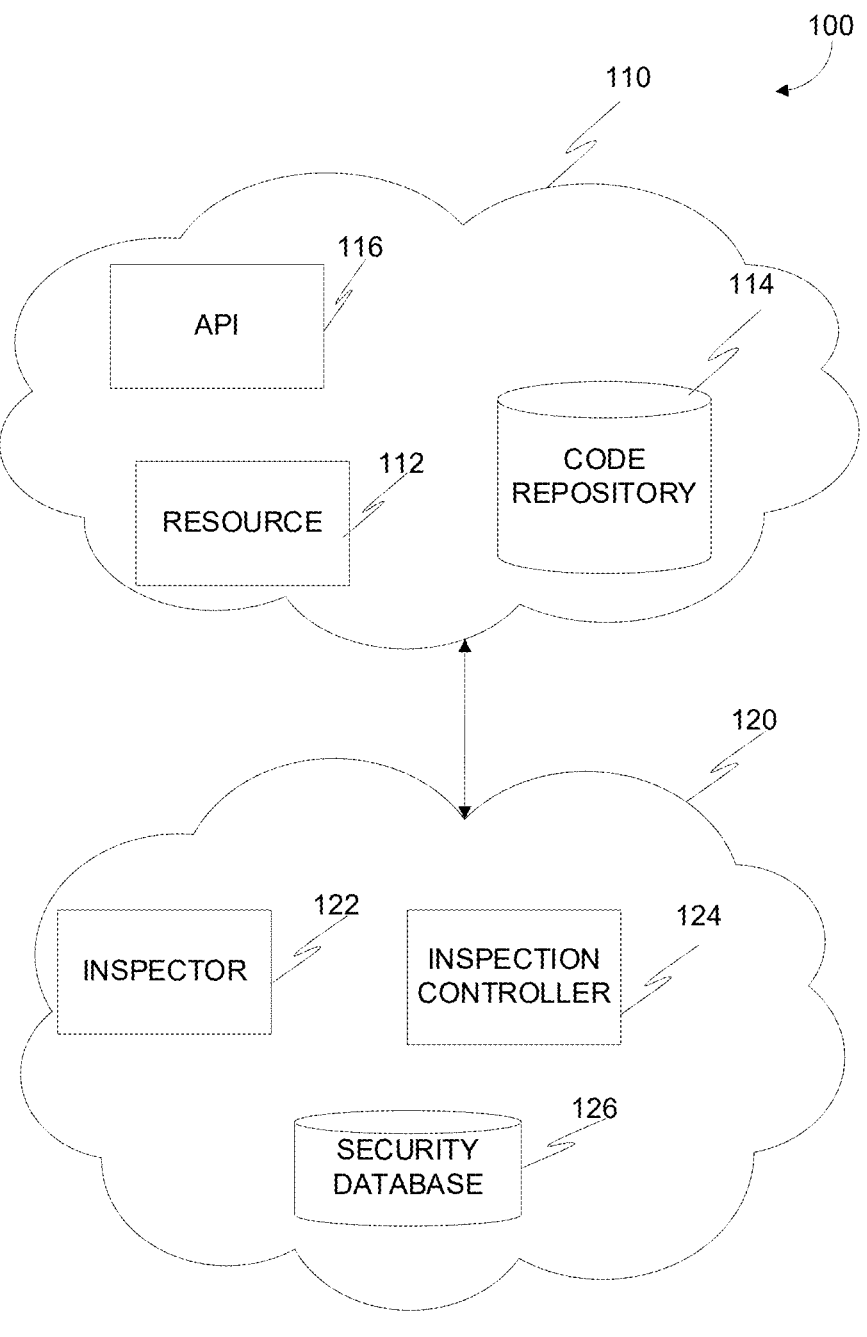
FIG. 1 is an example diagram of a cloud computing environment, implemented in accordance with an embodiment.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various disclosed embodiments include techniques for code detection of API paths. The disclosed embodiments provide techniques for the detection of API paths based on inspecting code objects corresponding to deployed resources in the cloud computing environment, for API hints. Moreover, the disclosed embodiments provide techniques for generating API paths that correspond to the detected API hints. Further, the disclosed embodiments determine whether the generated API paths are valid API paths. It is advantageous to utilize code detection to generate API paths because it provides for a more precise and accurate detection of API endpoints that may be potentially exposed. Further, it is advantageous to accurately detect API endpoints as they provide valuable insight for the detection and prevention of potential cybersecurity threats, vulnerabilities, data breaches, and the like.

FIG. 1 is an example schematic diagram 100 of a cloud computing environment, implemented in accordance with an embodiment. In an embodiment, the cloud computing environment 110 includes a virtual private cloud (VPC), Virtual Network (VNet), and the like, over a cloud computing platform. A cloud computing platform may be provided, for example, by Amazon® Web Services (AWS), Google® Cloud Platform (GCP), Microsoft® Azure, and the like.

In various embodiments, the cloud computing environment 110 includes cloud entities deployed as components of the cloud computing environment 110. In an embodiment, the cloud entity is a principal, a resource 112, a combination thereof, and the like. In an embodiment, the resource 112 is a cloud entity which provides access to a compute resource, such as a processor, a memory, a storage, and the like.

In some embodiments, the resource 112 is a virtual machine, a software container, a serverless function, and the like. In an embodiment, the resource 112 is a software application, such as a webserver, a gateway, a load balancer, a web application firewall (WAF), an appliance, and the like. In an embodiment, the cloud computing environment 110 is, includes, etc., a virtual machine, a software container, serverless function, a combination thereof, and the like. In certain embodiments, the resource 112, a code repository 114, an Application Programming Interface (API) 116, and the like, are deployed in the cloud computing environment 110.

In an embodiment, the API 116 is a software interface that enables software applications, software components, and the like, to communicate with each other using a set of definitions and protocols. In various embodiments, the API 116 is configured to enable deployed resources including software applications, software components, principals, cloud entities, hardware components, and the like, to communicate with each other. In some embodiments, the API 116 includes various types of APIs including Simple Object Access Protocol (SOAP) APIs, Remote Procedure Calls (RPC) APIs, WebSocket APIs, REST APIs, and the like.

In an embodiment, an API call is a request from a client to retrieve data from the resource 112, a service, and the cloud entity, deployed in the cloud computing environment. In some embodiments, an API call is a request from a client for the service, the resource, the cloud entity, and the like, to perform a specific function. In some embodiments, an API call is an API request which includes a protocol such as a HyperText Transfer Protocol (HTTP) (e.g., GET, POST, PUT, PATCH, etc.), a Uniform Resource Locator (URL) endpoint, request parameters, a header, a combination thereof, and the like. In some embodiments, a server (not shown) hosting the API 116 is configured to process the API request and return a response from the API 116 back to the client.

In an embodiment, the code repository 114 is configured to store at least a file. In some embodiments, the file is a configuration file, a code file, a source code file, and the like. In an embodiment, the code repository 114 is configured to store version control information (e.g., Git®), and the like. In some embodiments, the file is configured to include objects, code objects, code, a combination thereof, and the like.

In certain embodiments, the code repository 114 is configured to store objects, code objects, from which resources, such as resource 112, are deployed in the cloud computing environment 110. In an embodiment, the objects, code objects, and the like, include API paths, partial API paths, a hint of an API path, etc.

In various embodiments, the cloud computing environment 110 is monitored by an inspection environment 120. In some embodiments, the inspection environment 120 includes an inspector 122, an inspection controller 124, a security database 126, a combination thereof, and the like.

In various embodiments, the inspector 122 is configured to access files, code files, source code files, configuration files, a combination thereof, and the like, from the code repository 114. In some embodiments, the inspector 122 is configured to access code objects, objects, etc., stored in the code repository 114. In certain embodiments, the inspector 122 is configured to access code objects, objects, and the like, from files, configuration files, source code files, and the like, from the code repository 114.

In various embodiments, the inspector 122 is configured to detect deployed resources, such as resource 112, in the cloud computing environment. In some embodiments, the inspector 122 is configured to detect code objects from which the resource is deployed. In certain embodiments, the inspector 122 is configured to inspect only code objects corresponding to deployed resources, such as resource 112, for a hint of an API path.

In some embodiments, the inspector 122 is configured to initiate static analysis on a configuration file, a code file, a code object, a software file, a combination thereof, and the like, to detect API paths, API hints, a combination thereof, and the like. In some embodiments, the inspector 122 is configured to initiate static analysis only on objects, code objects, code, and the like, of which resources are deployed in the cloud computing environment 110.

In an embodiment, an API hint is an extracted line of code, regex, etc., which indicates a potential API path. In an embodiment, the inspector 122 is configured to inspect an inspectable disk for a cybersecurity object. For example, in an embodiment, a cybersecurity object is a password, a certificate, a cryptographic key, a software, an application, a library, a binary, a configuration file, a filesystem, a combination thereof, and the like.

In certain embodiments, the inspection environment 120 further includes an inspection controller 124. In some embodiments, the inspection controller 124 is configured to assign specific inspection tasks to the inspector 122. In various embodiments, the inspection controller 124 is configured to define inspection policies, rules, conditional rules, and the like, for the inspector 122. In an embodiment, the inspection controller 124 is configured to determine which object, code object, file, configuration file, code file, resource, and the like, the inspector 122 should inspect.

In certain embodiments, the inspection controller 124 is configured to determine the order of which object, code object, file, configuration file, code file, resource, the inspector 122 should inspect. In an embodiment, the inspection controller 124 is configured to allocate an inspector 122, inspection resources, etc., for inspecting an inspectable disk. In some embodiments, the inspection controller 124 is configured to initiate generation of an inspectable disk.

In various embodiments, a security database 126 is configured to store a representation of a cloud computing environment, for example, based on a unified data schema. In an embodiment, a unified data schema represents computing resources, entities, and the like, from a first cloud computing platform (e.g., AWS) and a second cloud computing platform (e.g., GCP) utilizing a single data schema.

In an embodiment, a representation of a resource, such as resource 112 deployed in the cloud computing environment, is stored in the security database 126. In an embodiment, the security database 126 includes a plurality of databases. In certain embodiments, the security database 126 is implemented as a graph database, tabular database, columnar database, a combination thereof, and the like.

In various embodiments, the security database 126 is configured to store representations of entities, objects, resources, systems, enrichment, insights, detections, findings, forensic artifacts, remediation actions, cybersecurity issues, cybersecurity threats, a combination thereof, and the like, of a cloud computing environment. In an embodiment, the representation includes a graph, a table, a visual depiction, numerical values, binary values, nodes, edges, a combination thereof, and the like.

In an embodiment, the security database 126 is configured to store a log of API calls, API responses, API 116 interactions with other entities, API interactions with resources, such as resource 112, and the like. In certain embodiments, the security database 126 is configured to store inspection results, inspection detections, inspection data, generated from the inspector's inspection of the cloud computing environment 110. In an embodiment, the security database 126 is configured to store static analysis results from the inspector 122 conducting static analysis on an object, a code object, a file, a configuration file, a code file, a combination thereof, and the like.

In an embodiment, the inspector 122 is configured to initiate static analysis on objects, code objects, corresponding to resources deployed in the cloud computing environment 110 in order to detect API hints from the code objects thereon. For example, in executable code an API hint may be "/users", "/checkbalance66", and the like. According to an embodiment, an inspection controller 124 is configured to generate potential API paths based on API hints detected in the code objects corresponding to deployed resources.

Figure 2:
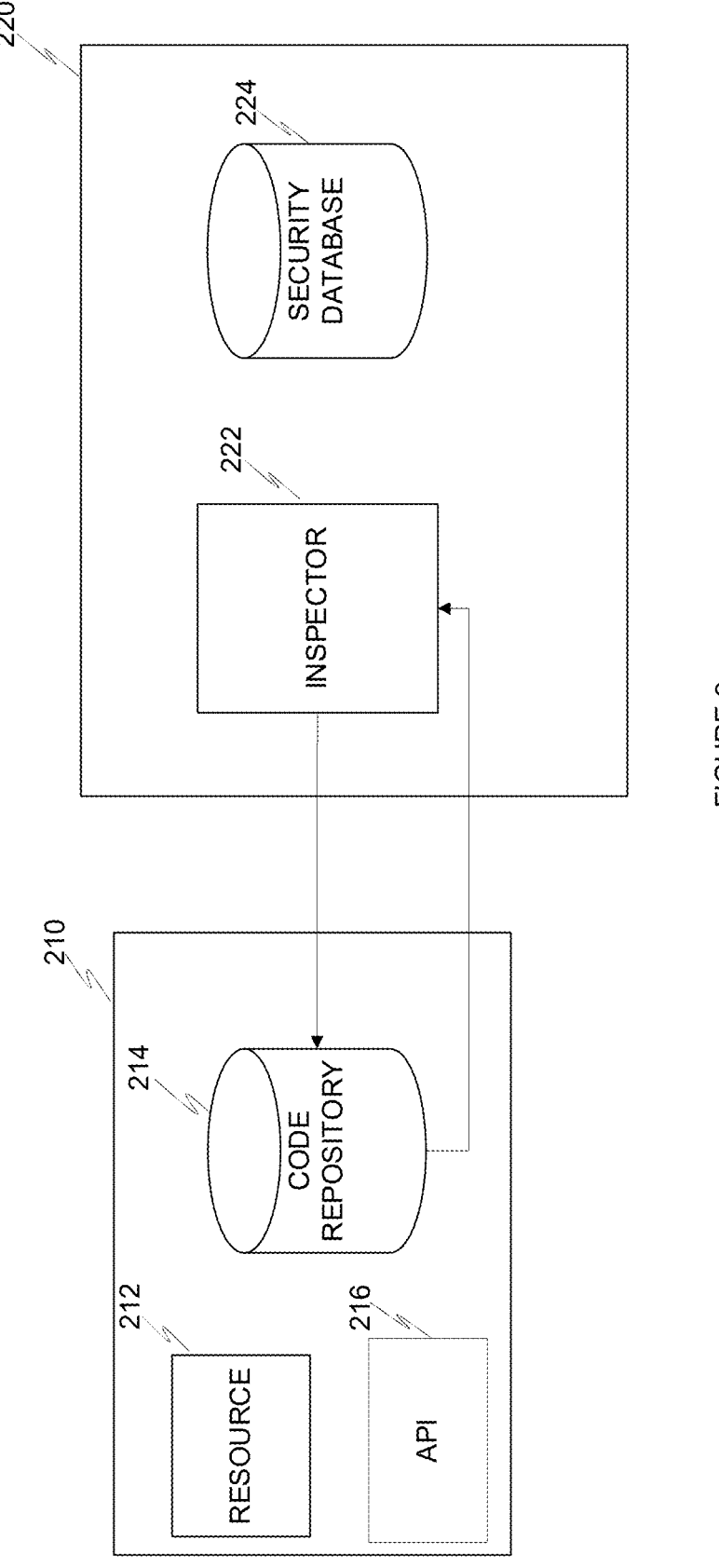
FIG. 2 is an example schematic diagram of an inspector accessing a code repository, implemented in accordance with an embodiment.

FIG. 2 is an example schematic diagram 200 of an inspector accessing a code repository, implemented in accordance with an embodiment.

In an embodiment, a resource 212, a code repository 214, an API 216, are components of the cloud computing environment 210. According to an embodiment, the cloud computing environment 210 is implemented as a virtual private cloud (VPC), Virtual Network (VNet), and the like.

In certain embodiments, the resource 212 is a software application, a software file. In an embodiment, the resource 212 is a cloud entity that provides access to a compute resource, such as a processor, a memory, a storage, and the like. In some embodiments, the resource 212 is a virtual machine, a software container, a serverless function, and the like. In an embodiment, the resource 212 is a software application, such as a webserver, a gateway, a load balancer, a web application firewall (WAF), an appliance, and the like.

In an embodiment, the Application Programming Interface (API) 216 is a software interface that enables software applications, software components, and the like, to communicate with each other using a set of definitions and protocols. In various embodiments, the API 216 is configured to enable resources, such as resource 212, to communicate with software applications, principals, cloud entities, hardware components, other resources, and the like, deployed in the cloud computing environment 210.

In an embodiment, an API call is a request from a client to retrieve data from the service, the resource 212, and the cloud entity. In some embodiments, the API call is a request from a client for the service, the resource 212, the cloud entity, and the like, to perform a specific function. In some embodiments, the API call is an API request which includes a protocol such as a HyperText Transfer Protocol (HTTP) (e.g., GET, POST, PUT, PATCH, etc.), a Uniform Resource Locator (URL) endpoint, request parameters, a header, a combination thereof, and the like.

In certain embodiments, the code repository 214 is deployed in the cloud computing environment 210. In various embodiments, the code repository 214 is configured to store at least a file. In some embodiments, the file is a configuration file, a code file, a source code file, and the like. In an embodiment, the code repository 114 is configured to store version control information (e.g., Git®), which is metadata generated from a version control system (e.g., Git®). In an embodiment, the code repository 214 is configured to store the changes made to files, source code, from a version control system, and the like. In some embodiments, the file, or plurality of files, stored in the code repository 214 is configured to include objects, code objects, code, a combination thereof, and the like.

In certain embodiments, the code repository 214 is configured to store objects, code objects, corresponding to deployed resources, such as resource 212, deployed in the cloud computing environment 110. In an embodiment, the objects, code objects, and the like, include API paths, partial API paths, a hint of an API path, etc.

In certain embodiments, the configuration file, code file, software files, and the like, include API paths, hints of API paths, API calls, API data, a combination thereof, and the like. In an embodiment, a hint of an API path indicates that an API path (or API endpoint) may be present, is a potential API path, etc. It is useful to generate potential API paths in order to discover a computing environment's true exposure, as each API path is a potential for a cybersecurity attack into the computing environment.

In various embodiments, an inspection environment 220 includes an inspector 222, a security database 224, and the like. In various embodiments, the cloud computing environment 210 is monitored by an inspection environment 220. In some embodiments, the inspection environment 220 includes an inspector 222, a security database 224, a combination thereof, and the like.

In certain embodiments, the inspector 222 is configured to access the code repository 214. In various embodiments, the inspector 222 is configured to access to access files, code files, source code files, configuration files, a combination thereof, and the like, from the code repository 214. In some embodiments, the inspector 222 is configured to access code objects, objects, etc., stored in the code repository 214. In certain embodiments, the inspector 112 is configured to access code objects, objects, and the like, from files, configuration files, source code files, and the like, from the code repository 214.

In various embodiments, the inspector 222 is configured to detect deployed resources, such as resource 212, in the cloud computing environment. In some embodiments, the inspector 222 is configured to inspect the accessed files, code files, configuration files, objects, code objects, a combination thereof, and the like, for the detection of code objects corresponding to deployed resources in the cloud computing environment 210.

In some embodiments, the inspector 222 is configured to initiate static analysis on detected code objects corresponding to deployed resources in the cloud computing environment to detect hints of API paths. In certain embodiments, the detected hints of are utilized to query the security database 224 for corresponding API calls, API paths, API responses, a combination thereof, and the like.

In various embodiments, the security database 224 is configured to store a representation of a cloud computing environment 210, for example, based on a unified data schema. In an embodiment, a unified data schema represents computing resources, entities, and the like, from a first cloud computing platform (e.g., AWS) and a second cloud computing platform (e.g., GCP) utilizing a single data schema.

In an embodiment, a representation of a resource, such as the resource 212 deployed in the cloud computing environment, is stored in the security database 224. In an embodiment, the security database 224 includes a plurality of databases. In certain embodiments, the security database 224 is implemented as a graph database, tabular database, columnar database, a combination thereof, and the like.

In various embodiments, the security database 224 is configured to store representations of entities, objects, resources, systems, enrichment, insights, detections, findings, forensic artifacts, remediation actions, cybersecurity issues, cybersecurity threats, a combination thereof, and the like, of a cloud computing environment. In an embodiment, the representation includes a graph, a table, a visual depiction, numerical values, binary values, nodes, edges, a combination thereof, and the like.

In certain embodiments, the security database 224 is configured to store inspection results, inspection detections, inspection data, generated from the inspector's inspection of the cloud computing environment 210. In an embodiment, the security database 224 is configured to store static analysis results from the inspector 222 conducting static analysis on an object, a code object, from which a resource, such as resource 212 is deployed. In various embodiments, the security database 224 is configured to store API calls, API responses, API data, API interactions with the resources deployed in the cloud computing environment 210, such as resource 212, a combination thereof, and the like.

Figure 3:
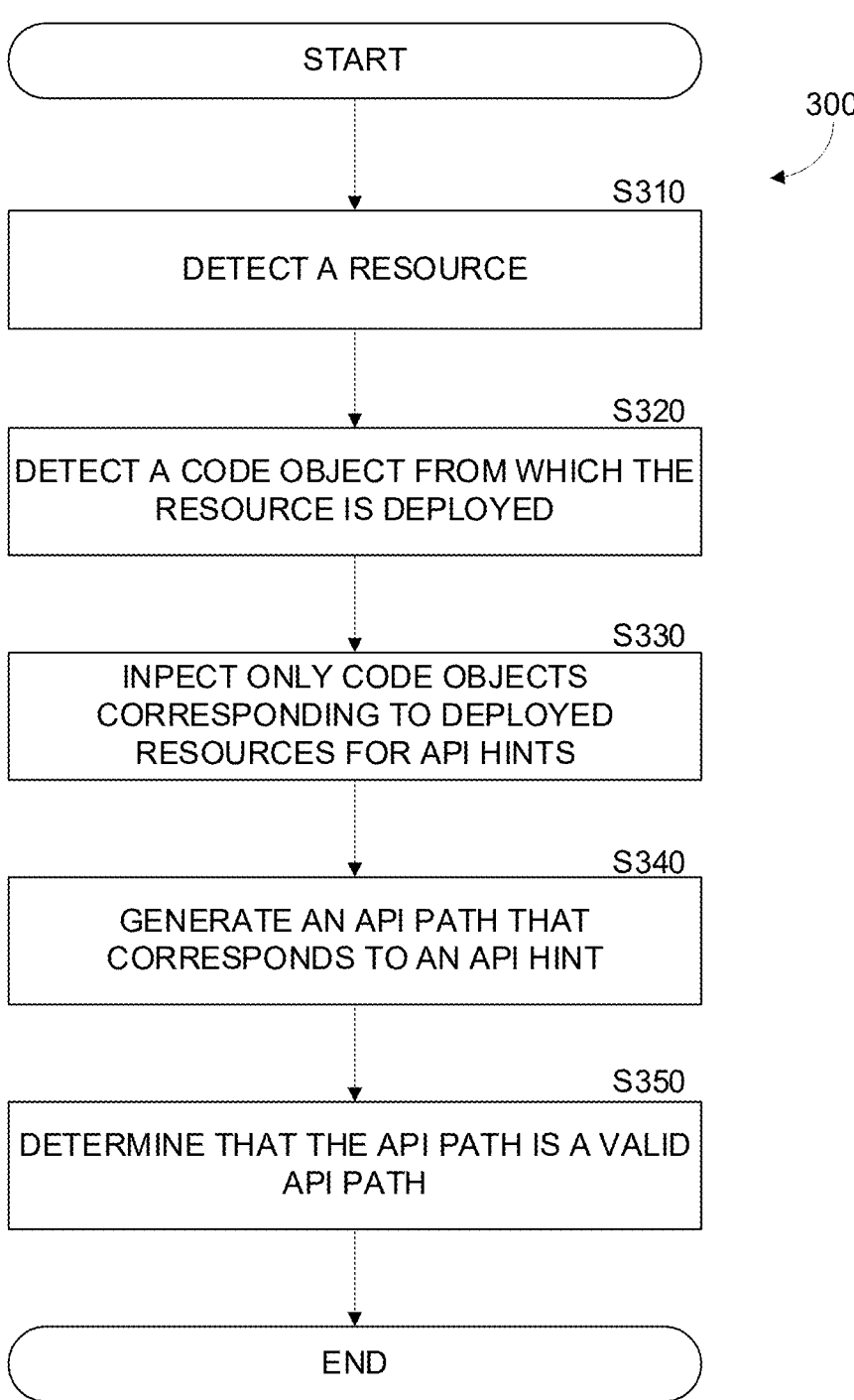
FIG. 3 is an example flowchart of a method for API path discovery utilizing code detection techniques, implemented in accordance with an embodiment.

FIG. 3 is an example flowchart 300 of a method for API path discovery utilizing code detection techniques, implemented in accordance with an embodiment.

It is advantageous, to inspect only code objects from which a resource is deployed rather than the vast amount of code objects stored in a code repository as this allows for a more efficient and accurate detection of exposed API paths. Further, inspecting only code objects from which a resource is deployed for API hints, rather than the entire amount of code objects stored in the code repository, is advantageous as this reduces time, and the processing resources of the system. Moreover, it is beneficial to utilize API hints for the efficient detection of exposed API paths that may indicate potential cybersecurity threats, vulnerabilities, exposures, and the like.

At S310, a resource is detected. In an embodiment, the resource is deployed in a computing environment, cloud computing environment, and the like. In an embodiment, the resource is a cloud entity which provides access to a compute resource, such as a processor, a memory, a storage, and the like. In some embodiments, the resource is a virtual machine, a software container, a serverless function, and the like. In an embodiment, the resource is a software application, such as a webserver, a gateway, a load balancer, a web application firewall (WAF), an appliance, and the like. In certain embodiments, the resource, or is implemented utilizing, a virtual machine, a software container, a serverless function, a combination thereof, and the like.

In some embodiments, an inspector is configured to scan the cloud computing environment in order to identify deployed resources. In an embodiment, the inspector is configured to inspect the cloud computing environment to detect deployed resources. In certain embodiments, the inspector is configured to scan the cloud computing environment to generate an inventory of deployed resources in the cloud computing environment.

In various embodiments, the inspector is configured to generate an API call to query a server that hosts the API for a list of deployed resources in the cloud computing environment. For example, in an embodiment, the API call "GET https://api.cloudcomputing.com/resources/", is generated by the inspector to query for deployed resources in the cloud computing environment. In an embodiment, the server that hosts the API is configured to process the API call for a list of deployed resources and return a response to the inspector. For example, in an embodiment, the server will return a list of software applications deployed in the cloud computing environment to the inspector.

At S320, a code object is detected. In an embodiment, a code object is detected of which the resource is deployed. In some embodiments, a code repository is configured to store a file. In an embodiment, the file is a configuration file, a code file, a source code file, and the like. In an embodiment, the code repository is configured to store version control information (e.g., Git®), and the like.

In some embodiments, the stored file is configured to include objects, code objects, code, a combination thereof, and the like. In certain embodiments, the code repository is configured to store objects, code objects, from which resources are deployed in the cloud computing environment. In an embodiment, the objects, code objects, and the like, include API paths, partial API paths, a hint of an API path, etc.

In various embodiments, the inspector, an inspection controller, a combination thereof, and the like, are configured to access the code repository, for example, utilizing a received credential. In an embodiment, the inspector is configured to inspect the code repository for files, configuration files, code files, source code files, and the like. In certain embodiments, the inspector is configured to inspect the code repository for code objects, software images, and the like. In some embodiments, the inspector is configured to inspect files, configuration files, code files, source code files, and the like, for code objects.

In some embodiments, the inspector is configured to filter all the code objects stored in the code repository, or code objects from files stored in the code repository, in order to detect only code objects from which a resource is deployed in the cloud computing environment. In some embodiments, code objects are units of non-executable code such as functions, classes, variables, modules, etc., that are utilized to deploy resources in the cloud computing environment. In various embodiments, code objects are utilized in Infrastructure as Code (IaC) platforms such as Terraform®, AWS® CloudFormation, Saltstack®, etc., to provision infrastructure in the cloud computing environment. In certain embodiments, code objects are utilized in an IaC to configure and deploy resources in the cloud computing environment.

In various embodiments, the inspector is configured to parse and analyze each of the code objects in order to specifically detect code objects that are utilized in the IaC to deploy a resource in the cloud computing environment. In certain embodiments, a predefined rule is used to filter the code objects to detect only code objects used to deploy a resource in the cloud computing environment. For example, in an embodiment, a predefined rule of detecting a code object based on it being used to define a deployed resource is implemented to detect only code objects used to deploy a resource. In certain embodiments, code objects which are utilized to deploy a resource in a computing environment are identified in a state file, for example, of an IaC platform. In an embodiment, a code object, software image, etc., has a file name which corresponds to a name in a namespace which is assigned to a resource.

At S330, code objects from which resources are deployed are inspected. In various embodiments, code objects corresponding to deployed resources are inspected for a hint of an API path. In an embodiment, code objects, and the like, include API paths, partial API paths, a hint of an API path, etc. In an embodiment, an API hint is an extracted line of code, regex, etc., which indicates a potential API path.

In some embodiments, the inspector is configured to inspect a detected code object for a potential API path utilized by a cloud computing environment. In an embodiment, an API path is a component or portion of a full API path, which is utilized as an API endpoint.

For example, in an embodiment, a hint of an API path is a version number, a name of a resource an API is interacting with, a resource identifier, query parameters, a combination thereof, and the like. In an embodiment, for example, a hint of an API path includes "v2/useraccount6/54321/verification."

In some embodiments, the inspector is configured to detect a hint of an API path based on conducting static analysis on the detected code objects from which a resource is deployed. In an embodiment, the inspector is configured to perform static analysis by analyzing the code object, code object, code, and the like, without executing the code object as code. In an embodiment, static analysis includes parsing the code objects in order to examine the code objects and detect an API hint. In certain embodiments, static analysis utilizes pattern matching to detect API hints from objects based on using a predefined pattern for an API hint and comparing it to the detected object.

At S340, an API path is generated. In some embodiments, an API path is generated which corresponds to a hint of an API path. In an embodiment, the generated API path is a potential API path.

In an embodiment, the security database is configured to store API calls, API responses, API interactions with other entities, API interactions with deployed resources, and the like. In an embodiment, the security database is configured to store static analysis results from the inspector conducting static analysis on code objects of which resources are deployed in the cloud computing environment.

In various embodiments, an API path is further generated by querying the security database. In an embodiment, the security database is queried based on a hint of an API path. For example, in an embodiment, the security database is queried for an API path, API call, etc., that corresponds to the API hint "v1/account/24/file." In certain embodiments, the API hint is compared to API calls, API responses, API interactions with other entities, API interactions with deployed resources, and the like. In certain embodiments, the API hint is compared to API calls in the security database to determine if the API hint matches any portion of an API call stored in the security database, in order to generate the corresponding API path.

For example, in an embodiment, the security database is queried to generate a corresponding API path for the API hint "useraccount/33/dir", which is compared to API calls stored in the security database, including the API call "GET https://api.com/v1/jon/33/file", and since the API hint matches a portion of the API call, the corresponding API path "v1/jon/33/dir" is generated.

In some embodiments, the API hint used to query the security database may not match a portion of any API call stored in the security database, thus an API path cannot be generated. For example, in an embodiment, an API hint of "v5/account25/2000" does not match any API call stored in the security database.

However, not all API paths are actually called, and some API endpoints may be accessible, rarely accessed, etc., and thus do not appear in the security database, for example, at a time of inspection. It is therefore advantageous to store a list, for example, of potential API paths which are generated based on an API hint and determine if a potential API is a valid API path. In an embodiment, where an API hint does not match an API call, for example, a potential API path is generated based on the API hint. In some embodiments, a language model is configured to receive an API hint and a plurality of existing API call requests, and generate a potential API path based on the received input. In an embodiment, the language model is configured to receive the input as a prompt, for example, based on a predetermined prompt template. In some embodiments, the potential API path is generated utilizing sentence embedding, statistical parameter analysis, a language model, a combination thereof, and the like.

In certain embodiments, where an API path is detected in a security database based on an API hint, the API path may be verified, in order to determine if the API path is an API endpoint which is an exposed API endpoint. In an embodiment, an exposed API endpoint is a cybersecurity issue, as it is a point of exposure for a computing environment.

At S350, it is determined that the generated API path is a valid API path. In an embodiment, in response to the determination that an API hint corresponds to an API path, the API path is not validated, since it is detected, for example, in the security database, but instead is verified. In some embodiments, the API path is generated based on a detected API hint, a protocol, a domain (e.g., from a base URL), a combination thereof, and the like. In various embodiments, a network access instruction is executed based on an API endpoint which in turn is generated based on the generated API path. In an embodiment, a potential API path is a validated API path based on a response of an executed network access instruction. A verified API path is an API path which has an event, for example, which indicates that the API path was utilized in an API call request.

In certain embodiments, a network access instruction includes an HTTP protocol command, a header, an API path, query parameters, an API key, authentication details, payload requests, a combination thereof, and the like. For example, in an embodiment, a network access instruction includes an HTTP command such as "GET", "POST", "PUT", "DELETE", and the like. In an embodiment, for example, a network access instruction includes a header such as "Content-Type: application/json6", which indicates that the content of the request is an application in a JavaScript Object Notation (JSON) format.

In some embodiments, an API is configured to receive the network access instruction and generate a response to the network access instruction.

In an embodiment, the network access response is processed to determine whether the generated API path is valid. For example, in an embodiment, the network access response of "ERROR: access denied", indicates that the API path is valid, and it is verified to be unexposed. In an embodiment, for example, the network access response of "error not found", indicates that the API path is invalid.

According to an embodiment, an API path is generated based on querying the security database with an API hint. A potential API endpoint is generated based on the API path, and a network access instruction is generated for the API endpoint to determine if the API path is a valid API path. Where an API path is detected, for example, in a cloud log, based on the API hint, validation is replaced with verification.

In some embodiments, verification is a process which includes determining if an API endpoint is exposed, for example, from an external network which is external to the computing environment in which the API endpoint is deployed. In some embodiments, verification includes executing a network access instruction over a network path which includes a public network, external network, a combination thereof, and the like.

In an embodiment, an API path may be valid, invalid, verified, validated, and unverified. A valid API path is one which is accessible, a verified API path is accessible from an external network, an invalid API path is not a functioning API path, and an unverified API path is an API path for which no determination has been made as to whether it is exposed or not, according to an embodiment.

Figure 4:
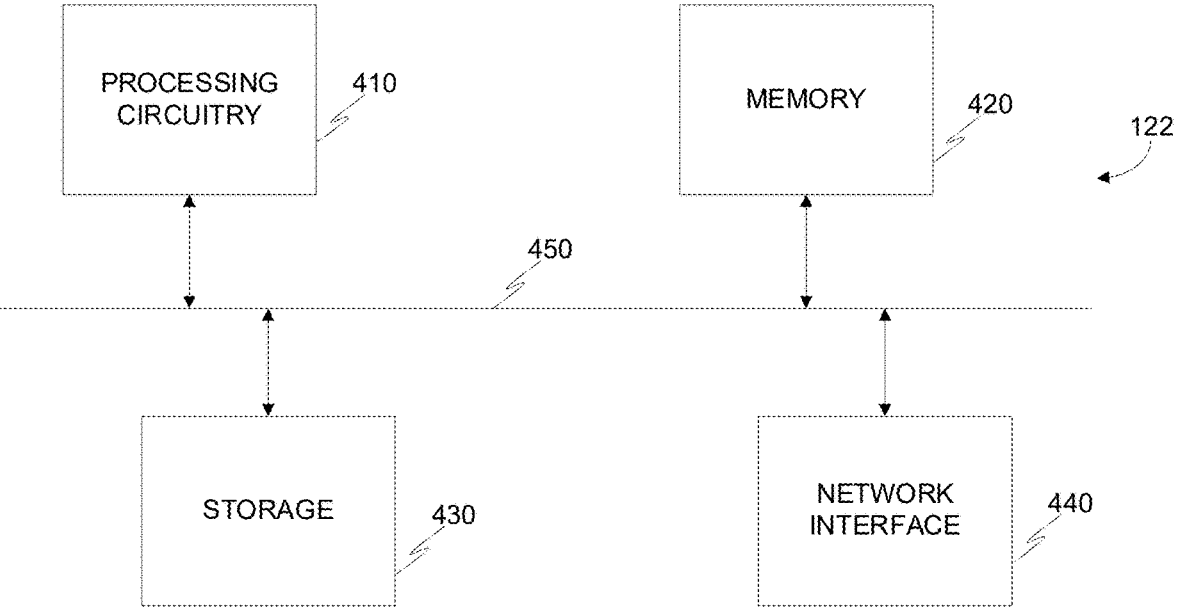
FIG. 4 is an example schematic diagram of an inspector, implemented in accordance with an embodiment.

FIG. 4 is an example schematic diagram of an inspector 122, according to an embodiment. The inspector includes a processing circuitry 410 coupled to a memory 420, a storage 430, and a network interface 440. In an embodiment, the components of the inspector 122 may be communicatively connected via a bus 450.

The processing circuitry 410 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), graphics processing units (GPUs), tensor processing units (TPUs), general-purpose microprocessors, microcontrollers, digital signal processors (DSPs), and the like, or any other hardware logic components that can perform calculations or other manipulations of information.

The memory 420 may be volatile (e.g., random access memory, etc.), non-volatile (e.g., read only memory, flash memory, etc.), or a combination thereof.

In one configuration, software for implementing one or more embodiments disclosed herein may be stored in the storage 430. In another configuration, the memory 420 is configured to store such software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 410, cause the processing circuitry 410 to perform the various processes described herein.

The storage 430 may be magnetic storage, optical storage, and the like, and may be realized, for example, as flash memory or other memory technology, compact disk-read only memory (CD-ROM), Digital Versatile Disks (DVDs), or any other medium which can be used to store the desired information.

The network interface 440 allows the inspector 122 to communicate with, for example, an inspection controller 124, a security database 126, and the like.

It should be understood that the embodiments described herein are not limited to the specific architecture illustrated in FIG. 4, and other architectures may be equally used without departing from the scope of the disclosed embodiments.

Furthermore, in certain embodiments the inspector 122, the inspection controller 124, and the like, may be implemented with the architecture illustrated in FIG. 4. In other embodiments, other architectures may be equally used without departing from the scope of the disclosed embodiments.

The various embodiments disclosed herein can be implemented as hardware, firmware, software, or any combination thereof. Moreover, the software is preferably implemented as an application program tangibly embodied on a program storage unit or computer-readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces.

The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer-readable medium is any computer-readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method for generating an Application Programming Interface (API) path utilizing code detection, comprising:
querying a cloud service provider (CSP) resource management API for deployment metadata identifying a resource, wherein the resource is deployed in a cloud computing environment of the CSP;
identifying based on the deployment metadata at least a code object, referenced by an infrastructure as code (IaC) deployment definition that instantiated the resource, of a plurality of code objects stored in a code repository;
statically analyzing only the at least a code object from which the resource is deployed for a hint of an API path;
generating, based on the hint of the API path, a machine-readable network request including a potential API path based on the hint of the API path;
transmitting the machine-readable network request to the resource in the cloud computing environment; and
classifying the potential API path as a validated API path based on a network protocol response received from the resource in response to transmitting the machine-readable network request.

2. The method of claim 1, further comprising:
scanning the cloud computing environment to detect the resource.

3. The method of claim 1, wherein detecting a resource further comprises:
querying an API of the cloud computing environment for identifiers of deployed resources.

4. The method of claim 1, further comprising:

accessing the code repository utilizing a received credential.

5. The method of claim 4, further comprising:

inspecting the code repository for code objects.

6. The method of claim 1, wherein detecting at least a code object from which the resource is deployed further comprises:

filtering the plurality of code objects in the code repository.

7. The method of claim 1, further comprising:

parsing each of the plurality of code objects to detect code objects that are utilized in an Infrastructure as Code (IaC) to deploy the resource in the cloud computing environment.

8. The method of claim 1, further comprising:

detecting the hint of the API path based on conducing static analysis on the at least a code object from which the resource is deployed.

9. The method of claim 1, wherein generating an API path that corresponds to the hint of the API path further comprises:

querying a security database based on the hint of the API path for a corresponding API path.

10. The method of claim 1, further comprising:

sending a second machine-readable network request only to the validated API path.

11. A non-transitory computer-readable medium storing a set of instructions for generating an Application Programming Interface (API) path utilizing code detection, the set of instructions comprising:

one or more instructions that, when executed by one or more processing circuitries of a device, cause the device to:

query a cloud service provider (CSP) resource management API for deployment metadata identifying a resource, wherein the resource is deployed in a cloud computing environment of the CSP;

identify based on the deployment metadata at least a code object, referenced by an infrastructure as code (IaC) deployment definition that instantiated the resource, of a plurality of code objects stored in a code repository;

statically analyze only the at least a code object from which the resource is deployed for a hint of an API path;

generate, based on the hint of the API path, a machine-readable network request including a potential API path based on the hint of the API path;

transmit the machine-readable network request to the resource in the cloud computing environment; and classify the potential API path as a validated API path based on a network protocol response received from the resource in response to transmitting the machine-readable network request.

12. A system for generating an Application Programming Interface (API) path utilizing code detection comprising:

a processing circuitry;

a memory, the memory containing instructions that, when executed by the processing circuitry, configure the system to:

query a cloud service provider (CSP) resource management API for deployment metadata identifying a resource, wherein the resource is deployed in a cloud computing environment of the CSP;

identify based on the deployment metadata at least a code object, referenced by an infrastructure as code (IaC) deployment definition that instantiated the resource, of a plurality of code objects stored in a code repository;

statically analyze only the at least a code object from which the resource is deployed for a hint of an API path;

generate, based on the hint of the API path, a machine-readable network request including a potential API path based on the hint of the API path;

transmit the machine-readable network request to the resource in the cloud computing environment; and classify the potential API path as a validated API path based on a network protocol response received from the resource in response to transmitting the machine-readable network request.

13. The system of claim 12, wherein the memory contains further instructions which when executed by the processing circuitry further configure the system to:

scan the cloud computing environment to detect the resource.

14. The system of claim 12, wherein the memory contains further instructions that, when executed by the processing circuitry for detecting a resource, further configure the system to:

query an API of the cloud computing environment for identifiers of deployed resources.

15. The system of claim 12, wherein the memory contains further instructions which when executed by the processing circuitry further configure the system to:

access the code repository utilizing a received credential.

16. The system of claim 15, wherein the memory contains further instructions which when executed by the processing circuitry further configure the system to:

inspect the code repository for code objects.

17. The system of claim 12, wherein the memory contains further instructions that, when executed by the processing circuitry for detecting at least a code object from which the resource is deployed, further configure the system to:

filter the plurality of code objects in the code repository.

18. The system of claim 12, wherein the memory contains further instructions which when executed by the processing circuitry further configure the system to:

parse each of the plurality of code objects to detect code objects that are utilized in an Infrastructure as Code (IaC) to deploy the resource in the cloud computing environment.

19. The system of claim 12, wherein the memory contains further instructions which when executed by the processing circuitry further configure the system to:

detect the hint of the API path based on conducing static analysis on the at least a code object from which the resource is deployed.

20. The system of claim 12, wherein the memory contains further instructions that, when executed by the processing circuitry for generating an API path that corresponds to the hint of the API path, further configure the system to:

query a security database based on the hint of the API path for a corresponding API path.

* * * * *